United States Patent Office 2,918,614
Patented Dec. 22, 1959

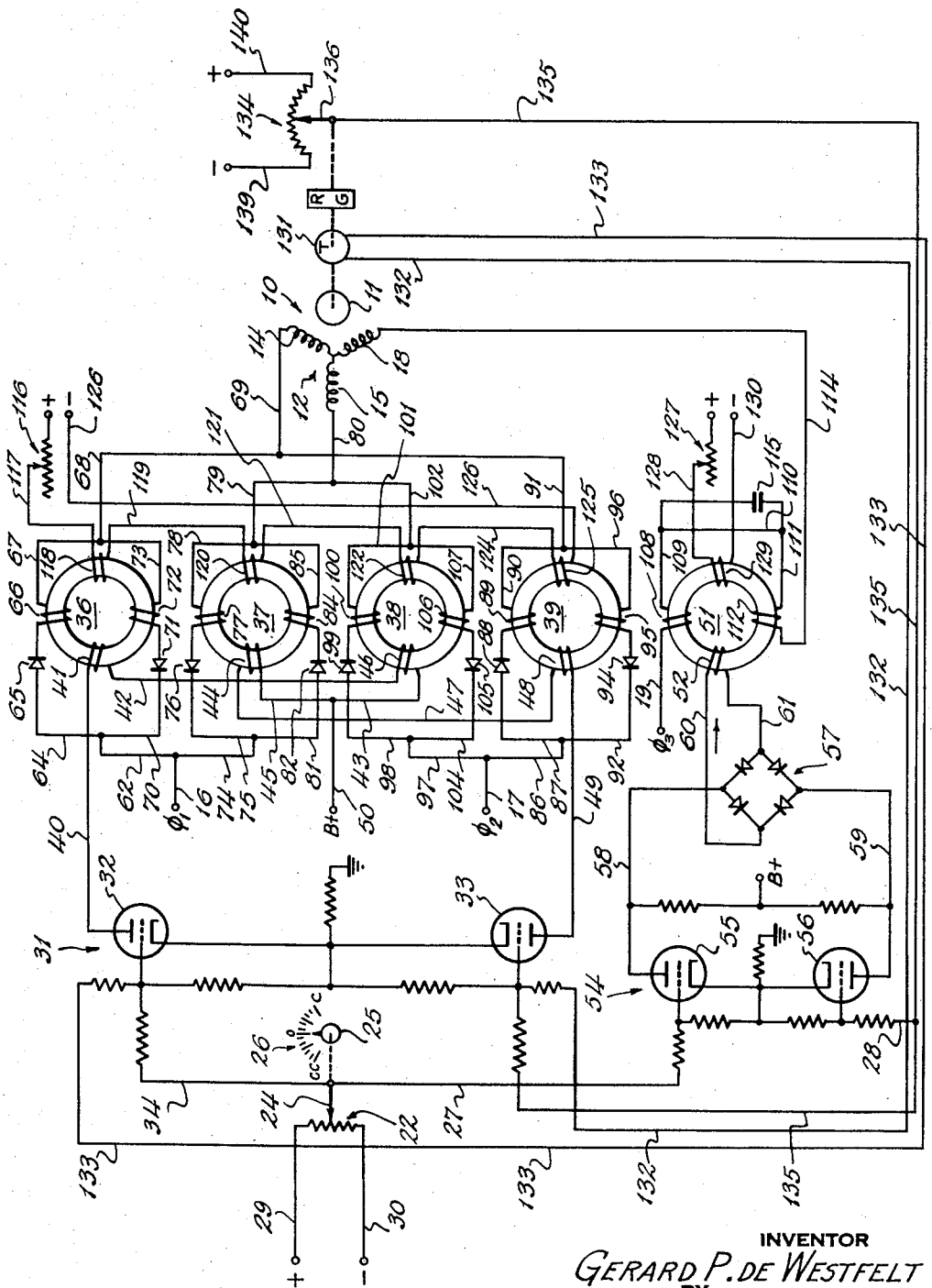

2,918,614

VARIABLE IMPEDANCE CONTROL MEANS FOR A THREE PHASE ALTERNATING CURRENT MOTOR

Gerard P. De Westfelt, Douglaston, N.Y., assignor to Sperry Rand Corporation, Great Neck, N.Y., a corporation of Delaware Application February 21, 1956, Serial No. 566,930

5 Claims. (Cl. 318—207)

This invention relates to a variable impedance control for a three-phase alternating current motor.

Reversibility of motor rotation is provided by the improved combination through interchanging two of the power supply conductors to the motor under control of the output of a bridge circuit having pairs of oppositely polarized rectifiers and the load windings of four self saturating magnetic amplifiers in the respective branches thereof. The bridge of the combination is connected across two of the power supply conductors to the three phase motor. The third or reference phase of the motor is supplied with power by a third input conductor through a saturable reactor. The purpose of the reactor in the reference input conductor to the motor is to provide a voltage drop between the power supply and the motor to prevent the motor from overheating in a standby condition.

For efficient operation of a three-phase alternating current motor, it is essential that the fields of the three stator windings be phased at 120 degrees apart in any mode of operation from standby, to full speed in either direction of rotation. The improved combination provides that the reactor and two of the four magnetic amplifiers saturate simultaneously in the same relative phase relationship to one another so that in consequence the desired phase relations between the fields of the motor are maintained. To effect this result in the improved combination for either direction of operation of the motor, two of the four control windings of the self saturating magnetic amplifiers in the bridge are excited with the control winding of the saturable reactor in the third input conductor to the motor.

The components of the combination provide high impedances in the input conductors to the motor that limit standby currents or overheating therein under null control signal conditions. Under control signal input conditions, the reactor and magnetic amplifiers in the respective supply conductors saturate or fire to thereby remove the impedances from the three-phase line and permit operation of the motor at an optimum torque. The firing points of the reactor and magnetic amplifiers of the combination may be adjusted by respective independent bias windings thereto to obtain desired regulation of the motor.

A feature of the present invention resides in provision of a reversing control for an alternating current motor that interchanges two of the supply conductors for the motor through a bridge having a self saturating magnetic amplifier in each branch thereof. This control is effected without opening the circuit between the alternating current supply source and the motor.

Other features and structural details of the subject invention will become apparent from the following description when read in relation to the accompanying drawing in which the single view shown is a combined schematic view and circuit diagram of a preferred embodiment of the invention.

With reference to the drawing, the controlled electric motor is indicated at 10. As represented, this element is a relatively heavy duty, three-phase alternating current induction motor with a squirrel cage rotor 11 and a three-phase wound stator 12. The variable phase windings 14 and 15 of the stator 12 are energized from a suitable source of alternating current supply indicated at $\phi_1$ and $\phi_2$ by way of the respective conductors 16 and 17. The reference phase winding 18 of the stator 12 is energized from the third phase of the suitable alternating supply indicated at $\phi_3$ by way of conductor 19. In operation, the stator windings 14, 15 and 18 of the motor 10 are energized from the three-phase alternating current source as represented by $\phi_1$, $\phi_2$ and $\phi_3$ by way of the conductors 16, 17 and 19. Through the provided controls, as hereafter described, the supply conductors 16 and 17 are interchangeably connected to the stator windings 14 and 15 of the motor 10. The rotational direction of the motor 10 is determined by the variable interconnection between conductors 16, 17 and phase windings 14, 15. The third phase winding 18 of the motor is directly connected to the fixed or reference phase of the power supply by way of conductor 19. The power input to the motor is accordingly effected through two variable phase supply conductors 16 and 17 and a single reference phase conductor 19.

A further element included in the improved controller is represented as a means for providing a primary control signal of reversible polarity for the motor 10. The polarity of the controlling input signal means is determinative of the clockwise or counterclockwise directional rotation of the motor. The magnitude of the control signal determines the speed of rotation thereof. As shown in the drawing, this means is constituted by one of the movable elements of an electrical bridge that includes a potentiometer 22 whose slider 24 is indicated as settable by a manually adjustable knob 25. In the arrangement provided, potentiometer 22 together with potentiometer 134 whose slider 136 is driven by the rotor 11 of the motor 10 through suitable reduction gearing constitutes the electrical bridge. As shown, the input to the bridge is obtained from a suitable source of direct current or battery, the polarization of which is indicated by the positive and negative representations in the drawing. Leads 29, 30 connect the direct current source to the potentiometer 22 and leads 139, 140 connect the source to the potentiometer 134. The four branches of the bridge are constituted by the respective resistance sections above and below the slider 24 of potentiometer 22 and the resistance sections to the right and left of the slider 136 of potentiometer 134. It will be understood that slider 24 of potentiometer 22 may be automatically as well as manually actuated as herein depicted. The means causing operation of the slider 24 is not material for the purposes of the present inventive subject matter inasmuch as the same may be effected either manually or automatically. As indicated, the knob 25 contains an index that is settable in relation to a fixed scale 26 having a null or zero center graduation. With the index of the knob 25 set at the center graduation and slider 136 at the midpoint of potentiometer 134, the bridge is balanced and there is a zero signal from the control means. Movement of the knob 25 either in a clockwise or counter-clockwise direction with relation to the center graduation under the conditions described unbalances the bridge and determines the polarity and magnitude of the signal of the primary control signal means appearing at leads 27, and 34.

The combination of elements shown in the drawing includes a full-wave, push-pull preamplifier generally indicated at 31 that receives the signal of the control signal means or potentiometer 22 and provides an output that determines the direction of rotation of the motor 10 through the operation of a pair of self saturating magnetic amplifiers. Amplification by a preamplifier such as shown is not essential where the signal of the control signal means is of sufficient magnitude to directly operate the hereinafter described magnetic amplifiers. The term preamplifier includes any desired number of stages of preamplification necessary to raise the control signal from the control signal means of the combination to the required usable magnitude. A single stage of amplification is provided by the electronic preamplifier indicated at 31. The preamplifier 31 shown consists of a pair of triodes 32, 33 whose control grids are respectively energized by the output signal of the control signal means or bridge. Lead 34 connects the grid of triode 32 with the slider 24 of potentiometer 22. Lead 135 connects the grid of triode 33 to the slider 136 of the potentiometer 134. The output circuit of the preamplifier 31 includes the control windings of four toroidal core type magnetic amplifiers respectively designated at 36, 37, 38 and 39. This circuit includes lead 40 to the plate of triode 32, the control winding 41 of reactor 36, lead 42 to the control winding 46 of reactor 38, and lead 43 to lead 50 and a suitable B+ supply indicated in the drawing. This circuit further includes lead 49 to the plate of triode 33, the control winding 48 of reactor 39, lead 47 to the control winding 44 of reactor 37, and lead 45 to the lead 50 and the B+ supply. The grid and cathodes of the respective triodes 32 and 33 are grounded as shown in the drawing. The output of the preamplifier 31 is a direction sensitive signal whose magnitude is dependent upon the signal from the control signal means.

The combination includes a further toroidal core type single saturable reactor 51 whose one control winding 52 is energized by a unidirectional signal that is proportional to the output of the control signal means. The elements shown in the drawing to obtain this result include a second push-pull preamplifier 54 consisting of triodes 55 and 56. The grid of triode 55 is connected to the output lead 27 from the potentiometer 22. The grid of triode 56 is connected to the output lead 135 from slider 136 by way of lead 28. A full wave rectifier 57 is contained in the output circuit of the preamplifier 54 which includes lead 58 to the plate of triode 55 and lead 59 to the plate of triode 56. Rectifier 57 provides a unidirectional output signal that is fed to the control winding 52 of the saturable reactor 51 by way of leads 60 and 61. The constant polarity signal at the one control winding 52 is accordingly proportional in magnitude to the signal of the control signal means.

In the combination of control elements provided, the load windings of the respective magnetic amplifiers 36, 37, 38 and 39 are contained in a bridge circuit connected across the variable supply conductors 16 and 17 to the motor 10. In this regard, the arms of the bridge containing the amplifiers 36 and 39 selectively control the input to winding 14 of the motor. Similarly, the arms of the bridge containing the amplifiers 37 and 38 selectively control the input to winding 15 of the motor. With supply conductor 16 connected to winding 14 through amplifier 36 the supply conductor 17 is connected to winding 15 through amplifier 38. For reverse operation of the motor, winding 14 is energized from supply conductor 17 through amplifier 39 and winding 15 is energized from the supply conductor 16 through amplifier 37. In the bridge, the amplifiers 36, 37, 38 and 39 are arranged in opposite pairs in the respective branches thereof to selectively control the supply of power from the conductors 16, 17 to the stator windings 14, 15. One pair of the amplifiers, namely, amplifiers 36, 38, fire or conduct responsive to a signal from triode 32 of the preamplifier 31 or control signal means and the other pair of reactors, namely, reactors 37, 39, function in a similar manner responsive to a signal from triode 33 of the preamplifier 31 or control signal means.

In the constructional arrangement shown, conductor 16 is connected to the stator winding 14 by way of lead 62, lead 64, rectifier 65, the load winding 66 of amplifier 36, lead 67, lead 68 and lead 69. A branch circuit of this connection includes lead 70 to lead 62, rectifier 71, the load winding 72 of amplifier 36, and lead 73 to lead 68. By the opposite branch of the bridge circuit, the conductor 16 is connected to the stator winding 15 of the motor by way of lead 74 to lead 16, lead 75, rectifier 76, the loading winding 77 of amplifier 37, lead 78, lead 79 and lead 80. A branch circuit of this connection includes lead 81 to lead 74, rectifier 82, the load winding 84 of amplifier 37, and lead 85 to lead 79. The other of the variable phase supply conductors 17 is connected to the stator winding 14 by way of lead 86 to lead 17, lead 87, rectifier 88, the load winding 89 of amplifier 39, lead 90, and lead 91 to lead 69. The other branch of this connection includes lead 92 to lead 86, rectifier 94, the load winding 95 of amplifier 39, and lead 96 to lead 91. Conductor 17 is also connected to the stator winding 15 of the motor by way of lead 97 to lead 17, lead 98, rectifier 99, the load winding 100 of amplifier 38, lead 101, and lead 102 to lead 80. The other branch of this connection includes lead 104 to lead 97, rectifier 105, the load winding 106 of amplifier 38 and lead 107 to lead 102. The described bridge circuit with the pair oppositely polarized rectifiers in each branch thereof is connected across the variable phase supply conductors 16 and 17. The conductors 16 and 17 are continuously energized from phase $\phi_1$ and phase $\phi_2$ of the alternating current power source.

Reactor 51 of the combination provides impedance in the reference phase supply lead 19 to the stator winding 18 of the motor. As shown $\phi_3$ of the alternating current supply is connected to winding 18 by way of lead 19, the load winding 108 of reactor 51, leads 109, 110, 111, the load winding 112 of reactor 51 and lead 114. A condenser 115 in shunt relation to this circuit compensates for any deviations in the desired 120 degree phase relationship of the inputs to the respective windings 14, 15 and 18 of the motor.

Separate bias means are provided for the magnetic amplifiers 36, 37, 38, 39 and the reference phase reactor 51. The circuitry for adjusting the bias of the amplifiers 36, 37, 38 and 39 includes a direct current source, potentiometer 116, lead 117, bias winding 118 for amplifier 36, lead 119, bias winding 120 for amplifier 37, lead 121, bias winding 122 for amplifier 38, lead 124, bias winding 125 for amplifier 39, and lead 126. Bias for the saturable reactor 51 is independently obtained from a direct current source, potentiometer 127, lead 128, bias winding 129 for reactor 51, and lead 130. Under standby conditions, the power to the motor from the alternating current source can also be regulated by adjustment of the bias winding controlling potentiometers 116 and 127.

Regulation of the closed loop motor control combination may be obtained by a feedback control providing a signal in accordance with the displacement of the motor from a null condition and/or a feedback control providing a signal in accordance with the rotational speed of the motor. The speed feedback signal means shown in the drawing is a tachometer signal generator 131 that is directly driven by the rotor 11 of the motor. The direct current output of generator 131 is connected in negative feedback relation to the control signal means providing the primary control signal to the amplifiers 36, 37, 38 and 39 of the combination. Output lead 132 from generator 131 is connected to the control grid of the triode 33 of preamplifier 31. Lead 133 from generator 131 is connected to the control grid of triode 32 of the preamplifier 31. The displacement feedback signal means shown is provided by the potentiometer 134 of the described bridge arrangement as controlled by the slider element 136 driven from the motor 10.

The amplifiers and reactor of the combination are designed so that for a maximum signal control input, the toroidal cores will be saturated and the internal resistance, then reduced to that of the load windings and rectifiers, will be equal to or lower than the tuned impedance of the load. Maximum power will then be transferred to the motor at the time it is under full load. Smooth and practically dead-beat operation of the motor is obtained by the combination displacement and speed feedback control provided. The system operates to drive the motor until the bridge is restored to a balanced condition with the sliders 24 and 136 of the respective potentiometers positioned to obtain this result. With the motor at a standstill condition, movement of knob 25 or slider 24 initiates an unbalance in the bridge with the potentiometers 22 and 134 thereon and effects operation of the motor to a point where the slider 136 of potentiometer 134 is moved sufficiently to restore the bridge to balance. When this occurs the motor stops operating. The motor is damped by the output of the tachometer generator 131. The feedback signals are both effective in the input circuit to the control windings of the respective reactors 36, 37, 38 and 39. The direction of operation of the motor 10 is clockwise with clockwise movement of knob 25 from the null position, the amplifiers 36 and 38 firing so that $\phi_1$ of the alternating current input supply is connected through the load windings of amplifier 36 to motor winding 14 through leads 68 and 69. Also $\phi_2$ of the alternating current input supply is connected through the load windings of amplifier 38 to the motor winding 15 through leads 102 and 80. With counterclockwise movement of the knob 25 from the null position, the amplifiers 37 and 39 fire to connect $\phi_1$ of the supply through the load windings of amplifier 37 to the motor winding 15. Amplifier 39 connects $\phi_2$ of the supply to the motor winding 14. The reactor 51 for the reference phase supply conductor 51 of the combination fires to connect supply $\phi_3$ with the motor winding 18 with an input to the amplifier bridge of either polarity. The direction of operation of the motor 10 is accordingly regulated by the amplifier bridge circuit as controlled by either the preamplifier 31 or control signal means. This regulation determines the input to the motor by way of the two variable phase supply conductors 16 and 17.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Means for controlling a three-phase alternating current motor including two variable phase supply conductors, a reference phase supply conductor, four self-saturating amplifiers having respective control and load windings, a bridge circuit connected across the variable phase supply conductors to the motor having pairs of oppositely polarized rectifiers and the load windings of the four magnetic amplifiers in the respective branches thereof, a single saturable reactor having a load winding in the reference phase supply conductor to the motor and one control winding, means for providing a control signal for the motor of reversible polarity, an exciting circuit between said control signal means and the control windings of opposed pairs of the magnetic amplifiers, and means connected to said reversible polarity signal means for exciting said reactor control winding unidirectionally to provide an input to the motor by way of the reference phase supply conductor.

2. Means for controlling a three-phase alternating current motor including two variable phase supply conductors, a reference phase supply conductor, a single saturable reactor having a load winding in the reference phase supply conductor to the motor and one control winding, means for providing a control signal for the motor of reversible polarity, and a circuit including a full wave rectifier connected to said reversible polarity signal means for exciting said reactor control winding unidirectionally to provide an input to the motor by way of the reference phase supply conductor.

3. Control means for a three-phase alternating current motor including control signal means, a preamplifier receiving the signal of said control signal means providing a reversible polarity output, two variable phase supply conductors to the motor, a reference phase supply conductor to the motor, four self-saturating magnetic amplifiers having respective control and load windings, a bridge circuit connected across the variable phase supply conductors having pairs of oppositely polarized rectifiers and the load windings of the four magnetic amplifiers in the respective branches thereof, a saturable reactor having a load winding in the reference phase supply conductor to the motor and a control winding, a circuit connected to said preamplifier for exciting the control windings of opposed pairs of the four magnetic amplifiers to determine the input to the motor by way of the two variable phase supply conductors, and means connected to said preamplifier for exciting the control winding of said reactor unidirectionally to provide an input to the motor by way of the reference phase conductor.

4. Control means for a three-phase alternating current motor of the character claimed in claim 3 including a bias winding for each of the four magnetic amplifiers, a bias winding for the reactor, a common exciting circuit for the bias windings of the four magnetic amplifiers, and an exciting circuit for the bias winding of the reactor.

5. Control means for a three-phase alternating current motor including control signal means, a preamplifier receiving the signal of said control signal means providing a reversible polarity output, two variable phase supply conductors to the motor, a reference phase supply conductor to the motor, a saturable reactor having a load winding in the reference phase supply conductor to the motor and a control winding, and a circuit including a full wave rectifier receiving the reversible polarity output of said preamplifier for exciting said reactor control winding unidirectionally to provide an input to the motor by way of the reference phase conductor.

References Cited in the file of this patent

UNITED STATES PATENTS

| | | |
|---|---|---|
| 2,559,513 | Palmer | July 3, 1951 |
| 2,683,846 | Carnegie et al. | July 13, 1954 |
| 2,695,982 | Soller et al. | Nov. 30, 1954 |
| 2,714,695 | Schaelchin | Aug. 2, 1955 |
| 2,725,511 | Jocobs | Nov. 29, 1955 |
| 2,734,157 | McKenney et al. | Feb. 7, 1956 |
| 2,750,549 | Crenshaw | June 12, 1956 |
| 2,792,541 | Markow | May 14 1957 |
| 2,853,666 | Carl et al. | Sept. 23, 1958 |

OTHER REFERENCES

"Automatic Feedback Control," by Ahrendt and Taplin, McGraw-Hill Co., 1951, page 253.